Aug. 25, 1959    A. C. McIVER    2,900,741
TEACHING APPARATUS
Filed Feb. 8, 1956    2 Sheets-Sheet 2

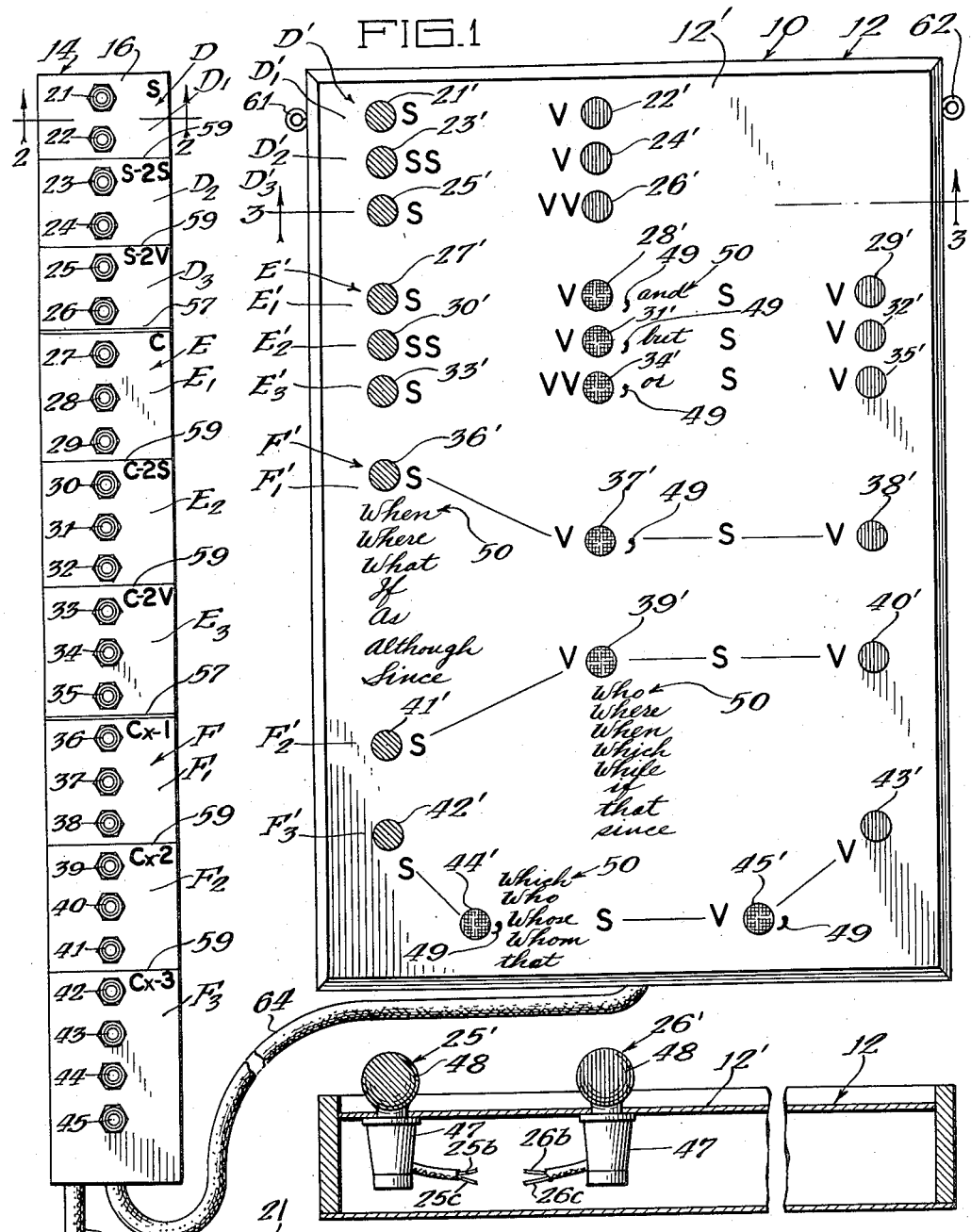

Inventor:
Alice Casey McIver
By: Wallace and Cannon
Attorneys

United States Patent Office 2,900,741
Patented Aug. 25, 1959

2,900,741

TEACHING APPARATUS

Alice Casey McIver, Winnetka, Ill.

Application February 8, 1956, Serial No. 564,261

3 Claims. (Cl. 35—35)

This invention relates to teaching apparatus and, more particularly, to teaching apparatus which is particularly designed and adapted for teaching grammar, punctuation, and proper sentence structure to children in elementary and high schools.

It is a primary object of my invention to afford a novel teaching apparatus which teaches the student, in a novel and expeditious manner, to correlate his speech with proper grammar and with proper punctuation.

Another object is to provide a novel teaching apparatus which is designed, constituted and arranged so that it may utilize things in the child's experience, the stop, go, and caution street signals commonly in use, in teaching proper grammar, punctuation, sentence structure, and speech habits to children.

A further object of my invention is to provide a relatively simple but efficient teaching apparatus which may be used for group instruction in classroom work for teaching proper speaking habits, grammar, punctuation, and sentence structure to children.

Another object of my invention is to provide a novel teaching apparatus which affords a mental challenge to a student's ability, and stimulates his interest in a novel and expeditious manner.

Yet another object of my invention is to provide a novel teaching apparatus, the proper use of which makes the student organize his thoughts before he speaks.

A further object of my invention is to provide a novel teaching apparatus which is fun to operate so that students look forward to reciting and taking an active part in the study of grammar, punctuation, and proper sentence structure.

Another object of my invention is to provide a novel teaching apparatus, the use of which stimulates the interest of the other students in the classroom in following the speaker's oral delivery, grammar, punctuation, and sentence structure.

Other and further objects of the present invention will be apparent from the following description and claims and are illustrated in the accompanying drawings, which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a front view of a teaching apparatus embodying the principles of my invention;

Fig. 2 is a detail sectional view taken substantially along the line 2—2 in Fig. 1;

Fig. 3 is a detail sectional view taken substantially along the line 3—3 in Fig. 1.

Figure 4:
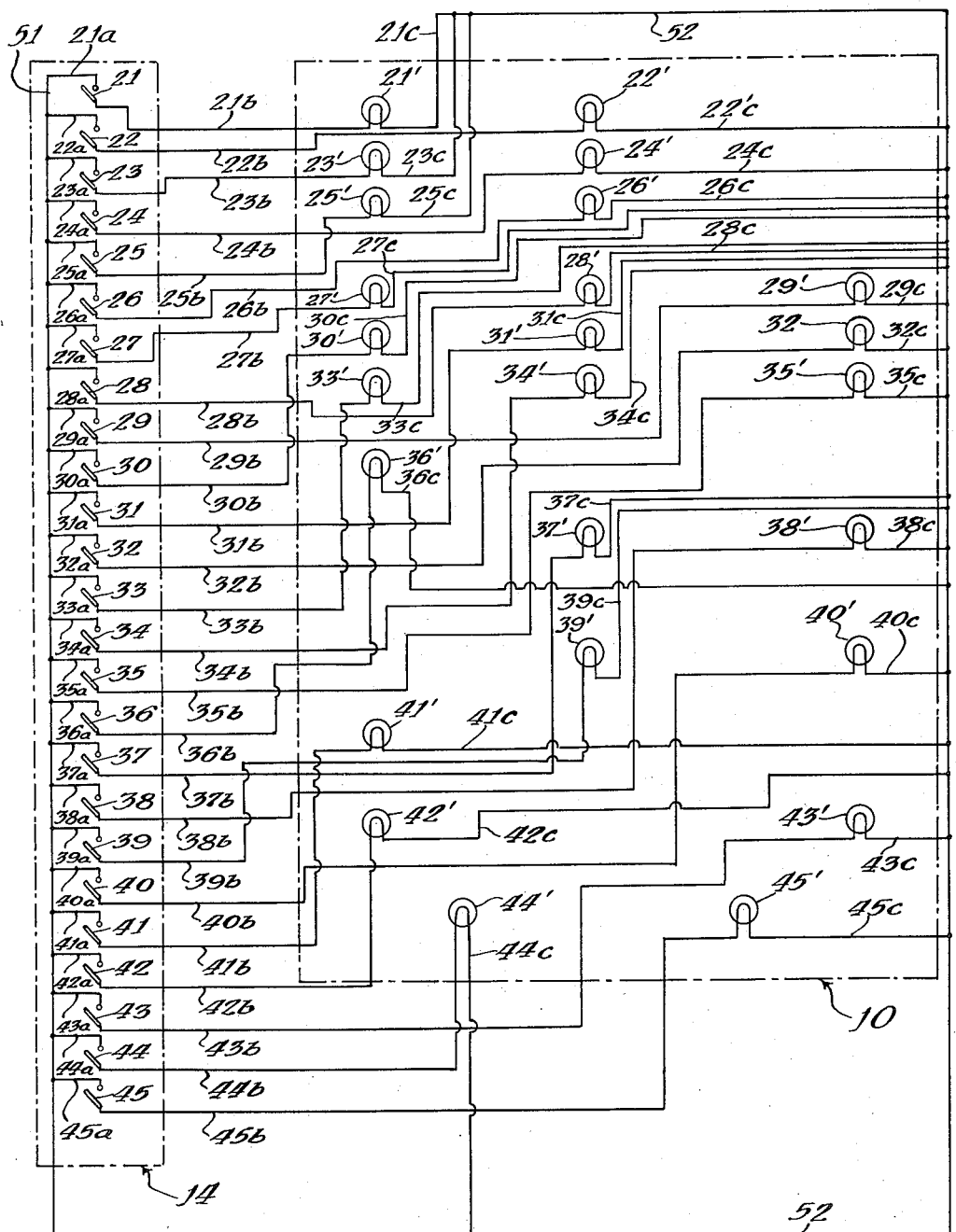
Fig. 4 is a wiring diagram illustrating the electrical connections between the various parts of the teaching apparatus shown in Fig. 1.

A teaching apparatus 10, embodying the principles of my invention, is shown in the drawings to illustrate the preferred embodiment of my invention.

The teaching apparatus 10 embodies, in general, a display panel or indicating panel 12, which is electrically connected to a control panel 14.

The control panel 14 embodies an elongated, substantially rectangular shaped base 16 along which are mounted, in spaced relation to each other, a plurality of push-button switches 21–45, respectively, Figs. 1 and 2.

The control panel 12 embodies a plurality of electric lamps 21′ to 45′, which are selectively electrically connected to the push-button switches 21–45, respectively, as will be discussed in greater detail presently. Each lamp 21′–45′ embodies a socket 47 mounted in the front face 12′ of the display panel 12, and a bulb 48 mounted in the socket 47 and projecting forwardly from the front face 12′ of the panel 12 so that it is readily visible from in front of the panel 12, Figs. 1 and 3.

Two main power lines or conductors 51 and 52, Fig. 4, are mounted in my novel teaching apparatus 10, and are connected to a suitable lead line 54 which may be connected to any suitable source of electric power by inserting a plug 55 mounted on the free end of the lead line 54 in any suitable receptacle such as, for example, the usual wall sockets, not shown, found in classrooms and the like.

The switches 21–45 are connected in parallel to each other between the power lines 51 and 52, with the lamps 21′–45′ each connected in series with one of the switches 21–45, respectively. Thus, as best seen in Fig. 4, one side of each of the switches 21–45 is connected by a conductor 21a–45a, respectively, to the power line 51; the other side of each switch 21–45 is connected by a conductor 21b–45b to one side of the lamps 21′–45′, respectively; and the other side of each lamp 21′–45′ is connected by a conductor 21c–45c, respectively, to the other power line 52. It will be seen from the foregoing that upon actuation of any one of the switches 21–45, when the plug 55 is connected to a suitable source of electric power, the bulb 48 of the corresponding one of the lamps 21′–45′, respectively, connected thereto will be selectively illuminated.

In teaching a student grammar and sentence structure with my apparatus, the student is first taught that there are three general types of sentences, namely, simple sentences, compound sentences, and complex sentences. My novel apparatus is adapted to teach the proper use, and the proper punctuation, of each and all of these types of sentences. For this purpose, the display panel 12 is divided off into three general areas, namely, the simple sentence area D′, the compound area E′, and the complex sentence area F′. The lamps 21′–45′ are divided among these areas to visually represent and illustrate the construction and punctuation of three types of sentences D′₁–D′₃, E′₁–E′₃, and F′₁–F′₃, in each of the areas D′–F′, respectively. The lamps 21′–45′ are divided unequally among the areas D′₁–D′₃, E′₁–E′₃ and F′₁–F′₃, respectively, with the lamps which are arranged in any one of these last mentioned areas being spaced from each other horizontally across the display panel 12 and with the respective areas disposed one below the other on the display panel 12, Fig. 1.

In each of the sentence-representing areas D′₁–F′₃ on the display panel 12 one green colored lamp 21′, 23′, 25′, 27′, 30′, 33′, 36′, 41′, and 42′ is disposed on the panel 12 toward the left side thereof, Fig. 1. Also, in each of the sentence-representing areas D′₁–F′₃ on the display panel 12, a red colored lamp 22′, 24′, 26′, 29′, 32′, 35′, 38′, 40′, and 43′, respectively, is disposed to the right of the respective green lamp in that area. The green lamps 21′, 23′ and 25′, and the red lamps 22′, 24′ and 26', respectively, are the only lamps in the areas $D'_1$–$D'_3$.

In the areas $E'_1$–$E'_3$, $F'_1$ and $F'_2$, a yellow colored lamp 28', 31', 34', 37' and 39', respectively, is mounted on the display panel between the green colored lamp and the red colored lamp in each of those areas. In the display area $F'_3$, two yellow colored lamps 44' and 45' are disposed between the green lamp 42' and the red lamp 43' of that area.

On the display panel 12:

The area $D'_1$ is representative of a simple sentence embodying a single subject and a single verb;

The area $D'_2$ is representative of a simple sentence embodying two subjects and one verb;

The area $D'_3$ is representative of a simple sentence of the type embodying a single subject and two verbs;

The area $E'_1$ is representative of a compound sentence of the type embodying two thoughts, with each thought embodying a single subject and a single verb;

The area $E'_2$ is representative of a compound sentence of the type embodying two thoughts with the first thought embodying two subjects and one verb, and the second thought embodying one subject and one verb;

The area $E'_3$ is representative of a compound sentence of the type embodying two thoughts with the first thought embodying one subject and two verbs, and the second thought embodying one subject and one verb;

The area $F'_1$ is representative of the type of complex sentence starting with a conjunction and having a comma after the conclusion of the first-half thought;

The area $F'_2$ is representative of a complex sentence of the type embodying a first-half and a second-half of a thought with each half embodying a single subject and a single verb, and the second half joined to the first half by a conjunction to make one complete thought; and The area $F'_3$ is representative of the type of complex sentence having an opening one-fourth ended by a comma and embodying a subject, a center one-half joined to the opening one-fourth by a conjunction, and also embodying a single subject and a single verb and being closed by a comma, and a closing one-fourth embodying a single verb.

On the front face of the display panel 12, I prefer to have indicia appear which indicates structural elements and punctuation of the particular type of sentence being represented by each area $D'_1$–$F'_3$, and the proper location of those structural elements and the punctuation so shown. For example, as shown in Fig. 1, the letters "S" and "V" may be used to indicate subject and verb, with these letters appearing the number of times in each area, and in the general location therein, that they appear in a sentence of the type indicated by that area; the usual symbol 49 for a comma may be used to indicate the location of that punctuation mark in any sentence-representing area requiring such punctuation; and representative joining words or conjunctions 50 may be printed adjacent to the same general location in any area as that in which they appear in a sentence represented by that area.

The front face of the control panel 14 is preferably divided, by double indicia lines 57, into three general areas D, E, and F, with the push-button switches 21–45 distributed among these areas in the same relation as the corresponding respective lamps 21'–45' are distributed among the areas D'–F' on the display panel 12, Fig. 1. The areas D–F on the control panel 14 are further divided by suitable indicia lines 59 into areas $D_1$–$D_3$, $E_1$–$E_3$ and $F_1$–$F_3$, respectively, with the switches 21–45 disposed in each of the respective areas $D_1$–$F_3$ being connected to the corresponding lamps 21'–45' disposed in the areas $D'_1$–$F'_3$, respectively, on the control panel 14, Fig. 1.

Each area $D_1$–$F_3$ on the control panel 14 is preferably suitably marked by a symbol or indicia which will enable a student operating the teaching apparatus 10 to quickly locate that portion of the switches 21–45 which control the operation of the lamps 21'–45' in any selected one of the areas $D'_1$–$F'_3$ on the display panel 12. The indicia I prefer to use for this purpose are as follows, as shown in Fig. 1:

"S," for a simple sentence having one subject and one verb;

"S–2S," for a simple sentence having two subjects;

"S–2V," for a simple sentence having two verbs;

"C," for a compound sentence having one subject and one verb in each half;

"C–2S," for a compound sentence having two subjects in one half;

"C–2V" for a compound sentence having two verbs in one half;

"Cx–1" for a complex sentence of the type represented by the area $F'_1$;

"Cx–2" for a complex sentence of the type represented by the area $F'_2$; and

"Cx–3" for a complex sentence of the type represented by the area $F'_3$.

The green lamps 21', 23', 25', 27', 30', 33', 36', 41' and 42' are representative of the start of the sentence. The red lamps 22', 24', 26', 29', 32', 35', 38', 40', and 43' are representative of the end of a sentence. The yellow lamps 28', 31', 34', 37', 39', 44' and 45' are representative of commas, conjunctions or pauses in a sentence between ideas.

Preferably, the switches 21–45 are of the same color as the bulbs 48 in the lamps 41'–45', respectively, for ready identification by the person actuating the switches.

In the use of my novel teaching apparatus, the display panel 12 may be mounted in position to be readily seen by the students in the class such as, for example, by suspending the display panel 12 from suitable hooks, not shown, inserted through the eyes 61 and 62 mounted on the panel 12. It will be remembered that the display panel 12 is electrically connected to the control panel 14 and the lead line 54, and these connections may be made through a suitable flexible line or conduit 64, Fig. 1. The flexible leads 54 and 64 are preferably of such length that the control panel 14 may either be disposed closely adjacent to the display panel 12 or may be disposed in a position remote from the display panel 12 such as, for example, at the student's desk or at a suitable podium, or the like, at the front of the classroom. In the use of my novel teaching apparatus 10, a student may be selected to read or speak to the class. As he either reads or speaks, he actuates the push-button switches 21–45 so as to illustrate, as he is speaking, the type of sentence he is then using and the punctuation and structure thereof. Thus, for example:

(1) When the student uses a simple sentence having one subject and one verb, he momentarily closes the switch 21 to thereby illuminate the green lamp 21' at the start of a sentence, and momentarily closes the switch 22 to thereby illuminate the red lamp 22' at the end of the sentence.

(2) When the student uses a simple sentence having two subjects and one verb, he momentarily illuminates the green lamp 23' and the red lamp 24' at the beginning and end of the sentence, respectively, by actuating the switches 23 and 24, respectively.

(3) When the student uses a simple sentence having a single subject and two verbs, he illuminates the green lamp 25' at the start of the sentence by momentarily actuating the switch 25, and momentarily illuminates the red lamp 26' at the end of the sentence by actuating the switch 26.

(4) When the student uses a compound sentence of the type represented by area $E'_1$ he momentarily closes the switch 27 at the start of the sentence to thereby illuminate the green lamp 27'; at the center of the sentence, he momentarily closes the switch 28 to thereby illuminate the lamp 28' to represent the comma and the pause between the two thoughts of the sentence; and at the end of the sentence he momentarily closes the switch 29 to thereby illuminate the red lamp 29'.

(5) When the student uses a compound sentence of the type represented by the area E'₂ he illuminates the green lamp 30' at the start of the sentence by momentarily closing the switch 30; at the center of the sentence he momentarily actuates the switch 31 to thereby illuminate the yellow lamp 31' and indicate the pause or comma between the two thoughts of the sentence; and at the end of the sentence he momentarily closes the switch 32 to thereby illuminate the red lamp 32'.

(6) When the student uses a compound sentence of the type represented by the area E'₃ he closes the switch 33 at the start of the sentence to thereby illuminate the green lamp 33'; he closes the switch 34 to thereby illuminate the lamp 34' at the time of the pause or comma between the two thoughts of the sentence; and he closes the switch 35 to thereby illuminate the red lamp 35' at the end of the sentence.

(7) When the student uses a complex sentence of the type represented by the area F'₁ he momentarily closes the switch 36 to thereby illuminate the green lamp 36' at the time he uses the conjunction at the start of the sentence; he momentarily closes the switch 37 to thereby illuminate the yellow lamp 37' at the pause or comma dividing the two thought portions of the sentence; and he closes the switch 38 to thereby illuminate the red lamp 38' at the close of the sentence.

(8) When the student uses a complex sentence of the type represented by the area F'₂ he closes the switch 41 to thereby illuminate the green lamp 41' at the start of the sentence; he closes the switch 39 to thereby illuminate the yellow lamp 39' at the time he uses the conjunction joining the two thought portions of the sentence; and he closes the switch 40 to thereby illuminate the red lamp 40' at the end of the sentence.

(9) When the student uses a complex sentence of the type represented by the area F'₃ he closes the switch 42 to thereby illuminate the green lamp 42' at the start of the sentence; he closes the switch 44 to thereby illuminate the yellow lamp 44' at the time he uses the conjunction joining the center half of the sentence to the first quarter of the sentence to thereby indicate the comma and the conjunction at that point; he closes the switch 45 to thereby illuminate the yellow lamp 45' at the end of the center half of the sentence to thereby indicate the comma at that point in the sentence; and he closes the switch 43 to thereby illuminate the lamp 43' at the end of a sentence.

It will be seen that in the use of my novel teaching apparatus 10, a student must organize his thoughts before speaking and must, while speaking, remain conscious of the proper grammar, punctuation, and sentence structure during each of his sentences. To successfully operate the teaching apparatus 10, he must recognize the type of sentence he is beginning, and, during the use of the sentence, must recognize and properly indicate the appearance of punctuation, conjunction, and the like. Such drill not only has the beneficial effect of requiring the student to previously organize his thoughts and become conscious of sentence structure but it also teaches the student to think on his feet and to pay attention to the proper use of grammar and pauses in his speaking.

Another benefit to be derived from my novel teaching apparatus 10 is that it affords a visual indicating device which the remainder of the classroom can follow with interest while a student is reciting or speaking. The remainder of the students in the classroom, as well as the teacher, can readily check the reciting student's indication of grammar and punctuation, and this affords a challenge to the students who are not reciting to closely follow the recitation in order to check the reciting student's visual representations of the types and structure of the sentences he is using.

From the foregoing it will be seen that I have afforded a novel teaching apparatus which may be readily utilized to good advantage in elementary schools and high schools as a valuable aid in teaching students grammar, punctuation and sentence structure.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A teaching apparatus comprising a mounting board having a front face, said face having three areas thereon, said areas representing simple sentences, compound sentences, and complex sentences, respectively, each of said areas having three smaller areas therein, each of said smaller areas representing a specific type of the more general type of sentence represented by the one of said first mentioned areas within which said smaller area is disposed, and means for selectively visually indicating on said face the general type, the specific type, start, finish, structure, and punctuation of a sentence being read or spoken, said means comprising a plurality of electric lamps mounted on said board in position whereby the illumination of each of said lamps is visible on said face when said lamp is energized, each of said smaller areas having one lamp of one color disposed therein to indicate, when illuminated, the start of a sentence of said specific type represented by said last mentioned area, and a second lamp of a second color disposed in said last mentioned area to indicate, when illuminated, the finish of said last mentioned sentence, each of said smaller areas in said compound and complex areas having a third lamp of a third color disposed therein between said one lamp and said second lamp in said area to indicate, when illuminated, a pause, represented by a comma or conjunction, in a spoken sentence of the specific type represented by said last mentioned area, one of said smaller areas in said complex area having a fourth lamp of said third color disposed therein between said one lamp and said second lamp in said last mentioned smaller area to indicate, when illuminated, a pause, represented by a comma or conjunction, in a spoken sentence of the specific type represented by said last mentioned area, and means connected to said lamps for selectively energizing the latter.

2. A teaching apparatus comprising a mounting board having a front face, said face having three areas thereon, said areas representing simple sentences, compound sentences, and complex sentences, respectively, each of said areas having three smaller areas therein, each of said smaller areas representing a specific type of the more general type of sentence represented by the one of said first mentioned areas within which said smaller area is disposed and means for selectively visually indicating on said face the general type, the specific type, start, finish, structure, and punctuation of a sentence being read or spoken, said means comprising a plurality of electric lamps mounted on said board in position whereby the illumination of each of said lamps is visible on said face when said lamp is energized, each of said smaller areas having one lamp of one color disposed therein to indicate, when illuminated, the start of a sentence of said specific type represented by said last mentioned area, and a second lamp of a second color disposed in said last mentioned area to indicate, when illuminated, the finish of said last mentioned sentence, each of said smaller areas in said compound and complex areas having a third lamp of a third color disposed therein between said one lamp and said second lamp in said area to indicate, when illuminated, a pause, represented by a comma or conjunction, in a spoken sentence of the specific type represented by said last mentioned area, one of said smaller areas in said complex area having a fourth lamp of said third color disposed therein between said one lamp and said second lamp in said last mentioned smaller area to indicate, when illuminated, a pause, represented by a comma or conjunction, in a spoken sentence of the specific type represented by said last mentioned area, a control panel, and a plurality of manually operable electric switches mounted on said panel in groups corresponding to said specific areas on said mounting board, said switches being electrically connected to said lamps for selectively controlling the energization of the latter.

3. A teaching apparatus as defined in claim 2 and wherein said one color is green, said second color is red, and said third color is orange.

References Cited in the file of this patent

UNITED STATES PATENTS

| | | |
|---|---|---|
| 450,615 | Delany | Apr. 21, 1891 |
| 1,617,272 | Peterson | Feb. 8, 1927 |
| 1,771,953 | Conklin | July 29, 1930 |
| 2,050,805 | Pumar | Aug. 11, 1936 |
| 2,430,205 | Barry | Nov. 4, 1947 |
| 2,520,649 | Northrop | Aug. 29, 1950 |

FOREIGN PATENTS

| | | |
|---|---|---|
| 767,777 | France | May 7, 1934 |